Mar. 3, 1925.

1,527,992

J. F. NORTON

LOCKING DEVICE FOR MOTOR VEHICLES

Filed Jan. 31, 1923

Inventor:
John F. Norton,
by his attorney,
Charles S. Gooding.

Patented Mar. 3, 1925.

1,527,992

UNITED STATES PATENT OFFICE.

JOHN F. NORTON, OF BOSTON, MASSACHUSETTS.

LOCKING DEVICE FOR MOTOR VEHICLES.

Application filed January 31, 1923. Serial No. 616,170.

*To all whom it may concern:*

Be it known that I, JOHN F. NORTON, a citizen of the United States, residing at Boston, in the county of Suffolk and State of Massachusetts, have invented new and useful Improvements in Locking Devices for Motor Vehicles, of which the following is a specification.

This invention relates to an improved locking device for motor vehicles and is particularly, though not exclusively, adapted for use upon a "Ford" automobile.

The object of the invention is to provide a simple, efficient device for locking the clutch, reverse and brake pedal levers of a motor vehicle in their extreme forward positions, at which time the clutch pedal lever has thrown the low speed gear into operative position, the reverse pedal lever has thrown the reverse clutch into operation and the brake pedal lever has applied the transmission brake with the further object in view of creating a condition of affairs which will render it impossible to either crank the engine or operate the vehicle without the knowledge or consent of a person authorized to operate the same, and having possession of the keys of the device.

Another object of the invention is to provide a housing for enclosing the portions of the pedal levers which project above the foot board, together with the locking means for said pedal levers, said housing also being provided with means whereby it may be locked in its closed position and thereby constitute an added source of protection for the motor vehicle.

The invention consists in the combination and arrangement of parts whereby the above objects and certain other objects hereinafter appearing may be attained as set forth in the following specification and particularly pointed out in the claims thereof.

Referring to the drawings.

Like numerals refer to like parts throughout the several views of the drawings.

Figure 1:
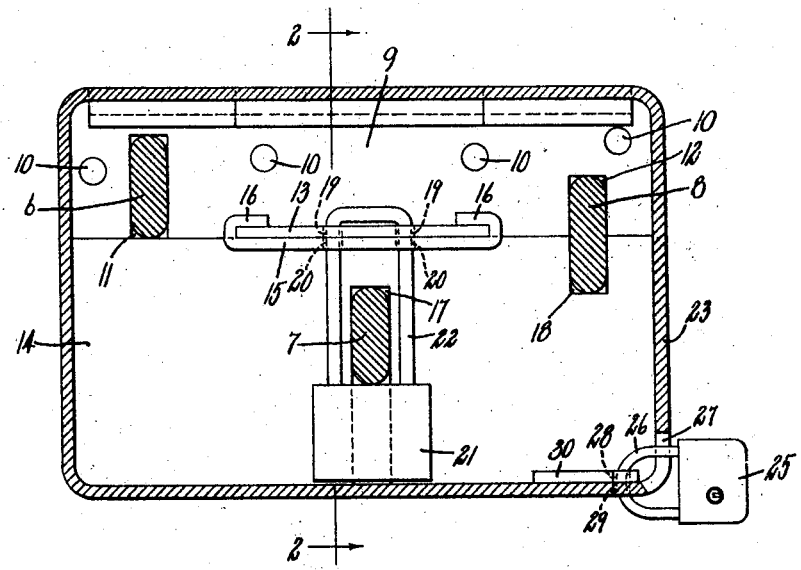
Figure 1 represents a plan view of a locking device for motor vehicles embodying the invention, the pedal levers and housing therefor being broken away and shown in section.

In the drawings, 5 represents the foot board of a motor vehicle, 6 represents a clutch pedal lever, 7 a reverse pedal lever and 8 a brake pedal lever. In this embodiment of the invention the pedal levers illustrated are those of a "Ford" automobile, and the clutch lever 6 operates a clutch forming a part of the transmission mechanism of the automobile and when said lever is in its extreme forward position as illustrated in Fig. 1, the low speed gear of the transmission has been thrown into operative position. The reverse lever 7 is operatively connected with a reverse clutch also forming a part of the automobile transmission and when said lever is in its extreme forward position as illustrated in Fig. 1, said reverse clutch has been thrown into operation. The brake pedal lever 8 is operatively connected with the transmission brake of the automobile, and when this lever is in its forward position as illustrated in Fig. 1, the transmission brake has been applied.

A plate 9 is rigidly fastened through the medium of a plurality of bolts 10 to the upper surface of the foot board 5 and said plate is provided with a slot 11 adapted to receive the clutch pedal lever 6 and another slot 12 adapted to receive the brake pedal lever 8. The plate 9 is so positioned upon the foot board 5 that when the levers 6 and 8 are in their extreme forward positions, that they will contact with the inner extremities of said slots. A flange 13 is formed integral with the plate 9 and projects upwardly therefrom for a purpose hereinafter to be described.

Co-operating with the plate 9 and provided for the purpose of holding the levers 6 and 8 in their respective slots within said plate 9 is another plate 14. The plate 14 is entirely separable from the plate 9 and has a flange 15 formed integral therewith and projecting upwardly therefrom. The flange 15 is provided with two inwardly bent extensions 16 formed integral therewith and adapted to interlock with the flange 13 of the plate 9 and the plate 14 is slid into position upon the plate 9 with the flanges 13 and 15 of said plates abutting together and with the extensions 16 of the flange 15 interlocking with the flange 13 of the plate 9.

The plate 14 is provided with a slot 17 adapted to receive the reverse pedal lever 7 when the latter is in its forward position as illustrated in Fig. 1, and also a slot 18 which is oppositely disposed to the slot 12 of the plate 9, and when the plate 14 is in position upon the plate 9, the lever 8 is located partly in the slot 12 of the plate 9 and partly in the slot 18 of the plate 14.

Located in the flange 13 of the plate 9 are a pair of holes 19 and formed in the flange 15 of the plate 14 are a pair of holes 20 which align with the holes 19. When the plate 14 is located in position upon the plate 9 and the levers 6, 7 and 8 are all positioned as illustrated in Fig. 1, the plate 14 is locked to the plate 9 to prevent said plate 14 from being disengaged therefrom through the medium of a padlock 21 of well known construction, which is provided with a bow 22 which extends through the openings 19 and 20 and also around the reverse lever 7. The bow 22 is fastened to the main body portion of the padlock 21 in the usual well known manner, its operation being controlled by a suitable key. When locked in position, the padlock 21 prevents any relative movement between the plates 9 and 14 and also locks the reverse lever 7 to said plates thereby preventing said lever from being moved rearwardly.

Figure 2:
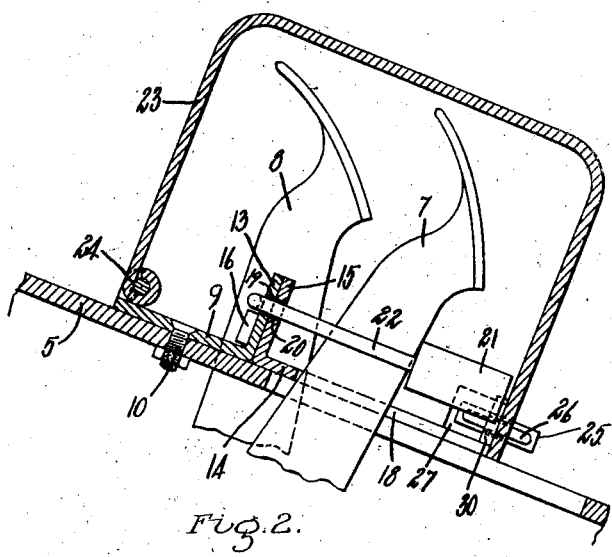
Fig. 2 is a vertical section taken on the line 2—2 of Fig. 1.

Fastened to the plate 9 is a housing 23, the latter being constructed in a manner to entirely enclose that portion of the pedal levers which projects above the foot board 5, together with the mechanism hereinbefore described for securing said levers in their forward position. The housing 23 is preferably secured to the plate 9 through the medium of a hinge 24 and when not in use, said housing is swung rearwardly into a position where it will not interfere with the operation of the levers. When, however, it is desired to provide an additional means for locking the various levers from that previously described, the housing 23 is swung into the position illustrated in Fig. 2 and a padlock 25 is provided, a bow 26 of which is inserted through an opening 27 provided in the housing 23 and through openings 28 and 29, the opening 28 being formed in a flange 30 which is formed integral with and projects upwardly from the plate 14, while the opening 29 is provided in the housing 23. The padlock 25 may be of any well known construction, being operated by a suitable key and when said padlock is applied as illustrated in Fig. 1, it will be impossible to lift the housing 23 from the position illustrated in Fig. 2.

The general operation of my improved locking device for motor vehicles is as follows:—When it is desired to lock the vehicle to prevent theft or operation by unauthorized persons, the levers 6 and 8 are first pushed into their extreme forward positions and the plate 14 is slid into interlocking engagement with the plate 9, in which position said plate 14 will abut against the rear edges of the levers 6 and 8 and thereby prevent a rearward movement of said levers. The lever 7 is now forced into its extreme forward position and the bow 22 of the padlock 21 is then inserted through the openings 19 and 20 in the flanges 13 and 15 respectively, and said bow is then snapped into position within the main body portion of the padlock 21 and thereby locked in the usual well known manner. When in position, the padlock 21 prevents the plates 9 and 14 from being separated, and also prevents a rearward movement of the lever 7. The various levers are now all securely locked and it will be impossible to either start the engine or operate the motor vehicle on account of the condition of affairs which exist in the transmission mechanism of said vehicle owing to the fact that the low speed gear is in operative position to move the vehicle forward at the same time that the reverse clutch mechanism is in position to operate the vehicle backwards and in addition, the transmission brake has also been applied. It will, therefore, be seen that the only way to move the vehicle is to drag the latter bodily which is rendered difficult because of the fact that the rear wheels cannot rotate and must, therefore, slide along the ground. If it is now desired to still further lock the mechanism as an added protection against theft, the housing 23 is swung forwardly and locked in its closed position through the medium of the padlock 25.

While the embodiment of the invention hereinbefore illustrated and described is adapted to be used in connection with three operating levers, it is evident that other embodiments of the invention may be provided for motor vehicles equipped with a greater or lesser number of operating levers without departing from the spirit of this invention, and it is evident that such construction falls within the scope of the appended claims.

I claim:

1. In combination, a plurality of operating levers, a plate rigidly fastened to a supporting member, said plate being provided with slots therein to receive said levers, a second plate adapted to slide into interlocking engagement with said first-named plate and obstruct the movement of said levers when the latter are located in said slots and means to lock said plates together.

2. In combination, an operating lever, a plate rigidly fastened to a supporting member, said plate being provided with a slot therein to receive said lever, a second plate adapted to slide into interlocking engagement with said first-named plate and obstruct the movement of said lever when the latter is located in said slot, a second operating lever and means to lock said plates together and also lock said last-named lever to said plates.

3. In combination, a plurality of operating levers, a plate rigidly fastened to a supporting member, said plate being provided with slots therein to receive said levers, a second plate adapted to slide into interlocking engagement with said first-named plate and obstruct the movement of said levers when the latter are located in said slots, another operating lever and means to lock said plates together and also lock said last-named lever to said plates.

4. In combination, a plurality of operating levers, a plate rigidly fastened to a supporting member, said plate being provided with slots therein to receive said levers, another operating lever, a second plate adapted to slide into interlocking engagement with said first-named plate and obstruct the movement of said first-named levers when the latter are located in said slots, said last-named plate being provided with a slot to receive said last-named lever and means to lock said plates together and also lock said last-named lever to said plates and in said last-named slot.

5. In combination, a plurality of operating levers, a plate rigidly fastened to a supporting member, said plate embodying therein a flange and being provided with slots therein to receive said levers, another operating lever, a second plate also embodying therein a flange, said last-named flange being adapted to slide into interlocking engagement with the flange of said first-named plate and obstruct the movement of said first-named levers when the latter are located in said slots, said last-named plate being provided with a slot to receive said last-named lever and means to lock said plates together and also lock said last-named lever to said plates and in said last-named slot.

6. In combination, a motor vehicle, a clutch pedal lever, a brake pedal lever, a plate rigidly fastened to said motor vehicle, said plate being provided with slots therein to receive said levers when the latter are located in their forward positions, a second plate adapted to slide into interlocking engagement with said first-named plate and obstruct the movement of said levers when the latter are located in said slots and means to lock said plates together.

7. In combination, a motor vehicle, a clutch pedal lever, a plate rigidly fastened to said motor vehicle, said plate being provided with a slot therein to receive said lever when the latter is located in its forward position, a second plate adapted to slide into interlocking engagement with said first-named plate and obstruct the movement of said lever when the latter is located in said slot, a reverse pedal lever and means to lock said plates together and also lock said reverse pedal lever to said plates and in said last-named slot.

8. In combination, a motor vehicle, a brake pedal lever, a plate rigidly fastened to said motor vehicle, said plate being provided with a slot therein to receive said lever when the latter is located in its forward position, a second plate adapted to slide into interlocking engagement with said first-named plate and obstruct the movement of said lever when the latter is located in said slot, a reverse pedal lever and means to lock said plates together and also lock said reverse pedal lever to said plates and in said last-named slot.

9. In combination, a motor vehicle, a clutch pedal lever, a brake pedal lever, a plate rigidly fastened to said motor vehicle, said plate being provided with slots therein to receive said clutch and brake pedal levers when the latter are located in their forward positions, a reverse pedal lever, a second plate adapted to slide into interlocking engagement with said first-named plate and obstruct the movement of said clutch and brake pedal levers when the latter are located in said slots, said last-named plate being provided with a slot to receive said reverse pedal lever when the latter is located in its forward position and means to lock said plates together and also lock said reverse pedal lever to said plates and in said last-named slot.

In testimony whereof I have hereunto set my hand in presence of two subscribing witnesses.

JOHN F. NORTON.

Witnesses:
 FRANKLIN E. LOW,
 HAZEL F. LA MUDGE.